: 
United States Patent

Voisine et al.

[11] Patent Number: 6,085,552
[45] Date of Patent: Jul. 11, 2000

[54] ALIGNING FIXTURE FOR MOLD OPENING AND CLOSING MECHANISM

[75] Inventors: Gary R. Voisine, East Hartford; Joseph C. Fasciano, Middletown; David K. Hwang, Storrs, all of Conn.

[73] Assignee: Emhart Glass S.A., Cham, Switzerland

[21] Appl. No.: 09/229,933

[22] Filed: Jan. 13, 1999

[51] Int. Cl.[7] .............................. C03B 9/353; C03B 9/41
[52] U.S. Cl. .............................. 65/158; 65/160; 65/171; 65/323; 65/359; 425/138; 425/150; 425/168; 425/171
[58] Field of Search ................. 65/27, 29.12, 29.18, 65/158, 159, 160, 171, 227, 229, 323, 357, 359, 361; 425/138, 150, 168, 171

[56] References Cited

U.S. PATENT DOCUMENTS

| | | | |
|---|---|---|---|
| 2,557,322 | 6/1951 | Storrs | 33/655 |
| 3,347,653 | 10/1967 | Carmi et al. | 65/307 |
| 3,415,158 | 12/1968 | Kindelan | 409/89 |
| 4,388,096 | 6/1983 | Boschi | 65/29.12 |
| 4,443,241 | 4/1984 | Jones | 65/27 |
| 4,606,746 | 8/1986 | Keller | 65/29.18 |
| 4,610,712 | 9/1986 | Keller et al. | 65/158 |
| 5,252,114 | 10/1993 | Sidler | 65/229 |
| 5,512,077 | 4/1996 | Welker | 65/29.18 |
| 5,824,131 | 10/1998 | Grant et al. | 65/359 |
| 6,009,727 | 1/2000 | Grant et al. | 65/359 |

*Primary Examiner*—Sean Vincent
*Attorney, Agent, or Firm*—Spencer T. Smith

[57] ABSTRACT

A mold opening and closing mechanism includes an aligning mechanism which has a horizontal mounting plate including a number of vertical openings for the number of molds, that is supported by a pair of spaced vertical uprights secured to the section frame top surface. A plurality of aligning cylinders are located in the vertical openings in the horizontal mounting plate and move parallel with the mold holder motion. Each cylinder includes surfaces configured to mate with the clamping surfaces of the mold holders. The axis of one of the aligning cylinders is held but not clamped at the theoretical centerline so it can move to the actual centerline when the mold holders are located at the advanced clamped closed position. A position transducer is mounted parallel with the mold holder motion to sense movement of the axis of one of the aligning cylinders and a computer receiving positional data from the transducer compares the theoretical centerline with the actual centerline determined from the data and defines a displacement offset for the displacement program to align the mold holders to the theoretical centerline.

3 Claims, 4 Drawing Sheets

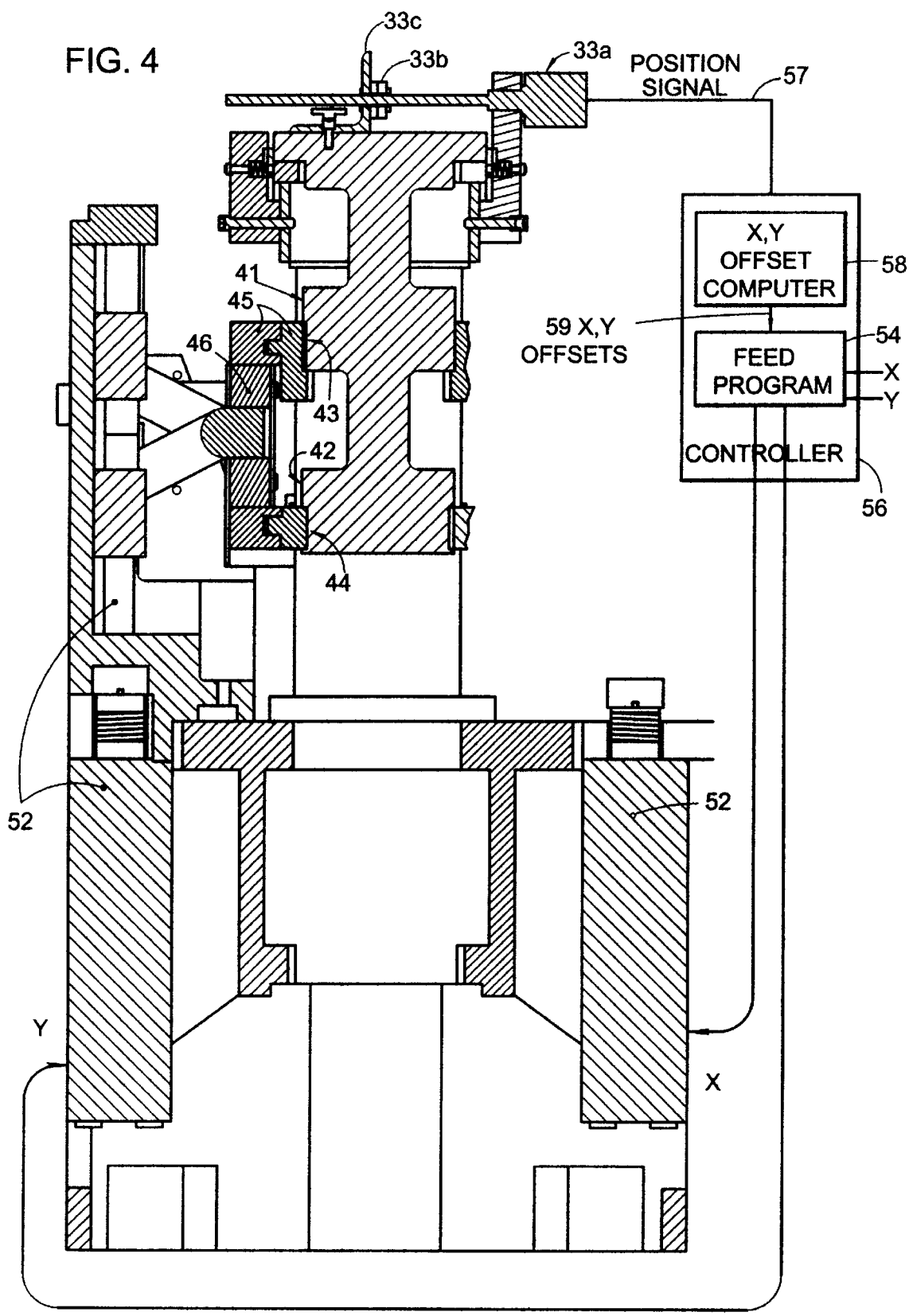

140 # ALIGNING FIXTURE FOR MOLD OPENING AND CLOSING MECHANISM

The present invention relates to I.S. (individual section) machines for manufacturing glass containers, and specifically, to the mold and blow mold opening and closing mechanisms for these machines.

BACKGROUND OF THE INVENTION

An I.S. machine has a plurality of identical sections each of which has a blank station which receives one or more gobs of molten glass and forms them into parisons having a threaded opening at the bottom (the finish) and a blow station which receives the parisons and forms them into bottles standing upright with the finish at the top. The blank station includes a pair of opposed blank molds which are displaceable from a separated position to a closed position. A vertically displaceable plunger of a plunger mechanism may be used to form the parison within the closed mold. The blow station includes a pair of opposed blow molds which are displaceable from a separated position to a closed position. An invert and neck ring holder mechanism which includes an opposed pair of neck ring arms which support neck ring halves which are the finish defining portion of the blank mold, is rotatable about an invert axis to carry the parisons (supported at the finish) from the blank station to the blow station inverting the parisons from a finish down to a finish up orientation in the process.

In state of the art I.S. machines, alignment between the blank molds and plunger mechanism is critical. It is also important to have the blow molds in line with the blank molds for neck ring transfer. State of the art mold open and close mechanism alignment requires multiple fixtures to first set the supporting brackets and then set the mold opening and closing linkage to the centerline position as well as the open position. After alignment is completed, levers must be doweled making it difficult to reset alignment in the future. Many steps in the aligning procedure make it difficult to perform accurately. Also, the fixtures do not allow the alignment to be checked in the normal operating mode— only static alignment can be done. It is also difficult to check the alignment when the machine is hot because of the time it takes to assemble the fixture to the section.

OBJECT OF THE INVENTION

It is accordingly an object of this invention to provide an improved mold open and close mechanism for an I.S. machine that will overcome these limitations.

Other objects and advantages of the present invention will become apparent from the following portion of this specification and from the accompanying drawings that illustrate in accordance with the mandate of the patent statutes a presently preferred embodiment incorporating the principles of the invention.

BRIEF DESCRIPTION OF THE DRAWINGS

Referring to the drawings:

FIG. 4 is a cross sectional view similar to FIG. 3 showing the aligning fixture at either the blank station or the blow station of a section of an I.S. machine.

BRIEF DESCRIPTION OF THE PREFERRED EMBODIMENT

Figure 1:
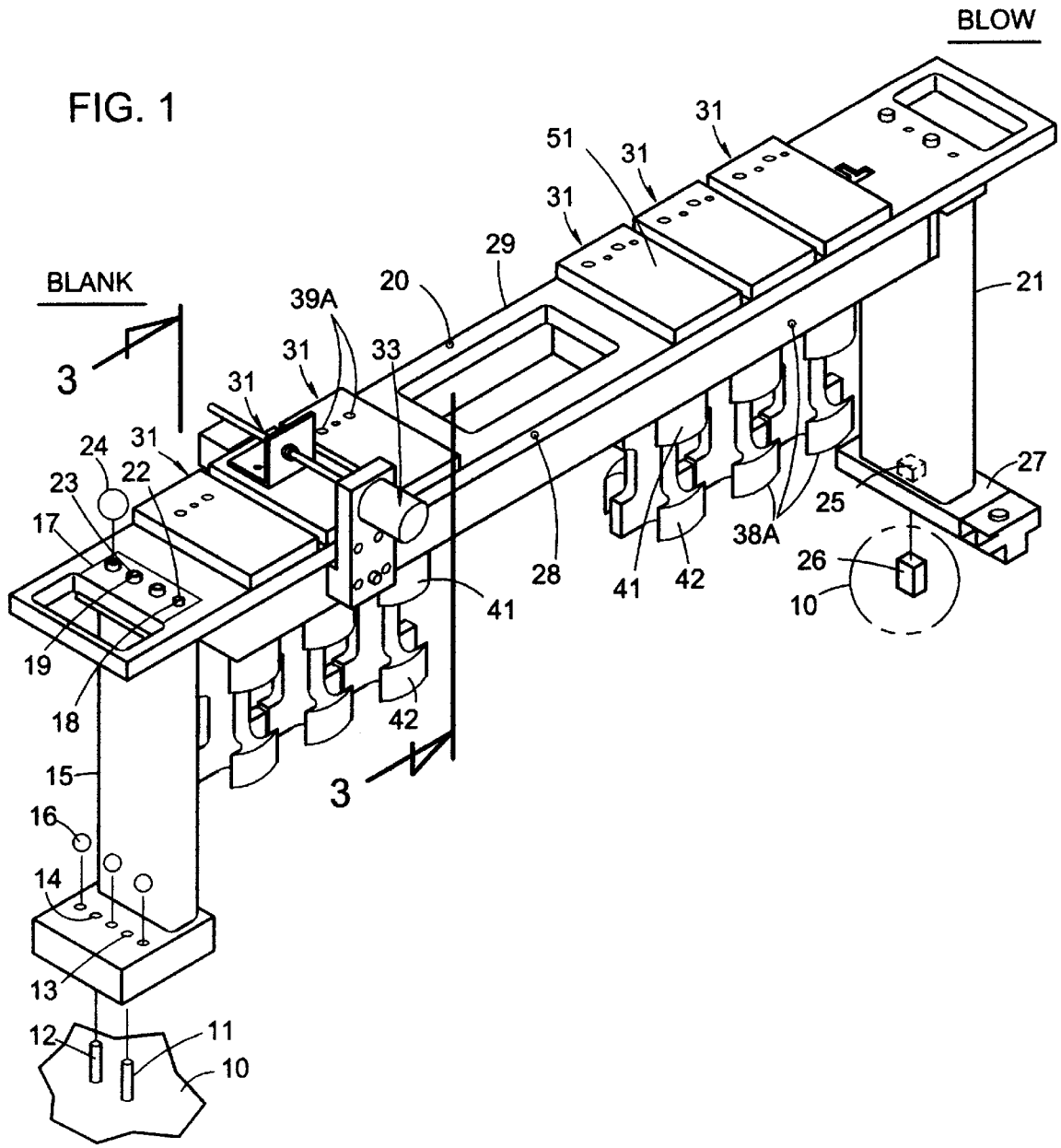
FIG. 1 is an oblique view of the mold opening and closing mechanism aligning fixture, made in accordance with the teachings of the present invention, mounted on a section frame.

An I.S. machine has a plurality of individual sections (usually 8, 10 or 12) each having a section frame 10 (only small portions of the top wall of the frame are shown for purposes of clarity). Complete details of a state of the art I.S. machine with which this invention is intended to be used are disclosed in U.S. Pat. No. 5,824,131. Fixed to the top surface of each section frame is a round dowel 11 and a diamond dowel 12 which locate glass forming mechanisms including the mold opening and closing mechanism which are supported on the top surface of the section frame. These dowels are accurately located from the frame centerline. This centerline is a line lying in a plane perpendicular to the frame top surface that is located from one side edge so as to be equidistant from both the left hand and right hand side edges, and is the theoretical centerline.

A first upright 15 has holes 13, 14 which cooperate with the dowels 11, 12 when removably assembled to the section frame 10 and is clamped with handle screws 16. This first upright 15 has a top portion 17 which has fixed to it a round dowel 18 and a diamond dowel 19. These dowels 18, 19 are accurately located from the lower holes 13, 14. A mounting plate assembly includes a mounting plate 20 and a second upright 21 which is secured to the mounting plate. Holes 22, 23 in the left end of the mounting plate 20 cooperate with the dowels 18, 19 in the first upright 15 so that when the mounting plate 20 is removably assembled to this upright 15 and clamped with handle screws 24, the second upright 21 is selectively spaced from the first upright 15 and the mounting plate 20 is horizontal. The second upright 21 has a hole 25 in the bottom portion 27 which is accurately located relative to the holes 22, 23 in the mounting plate. Fixed to the frame 10 is a diamond dowel 26 that is accurately located from the frame centerline. This hole 25 cooperates with the dowel 26 when the second upright 21 is removably assembled to the frame 10 and clamped with handle screws 16. The mounting plate 20 has parallel sides 28, 29. The holes 22, 23, and 25 are located from the parallel sides 28, 29 so that when the mounting plate assembly including the second upright 21 and the first upright 15 are assembled to the frame 10, the parallel sides 28, 29 will be symmetrical about the frame centerline.

Figure 2:
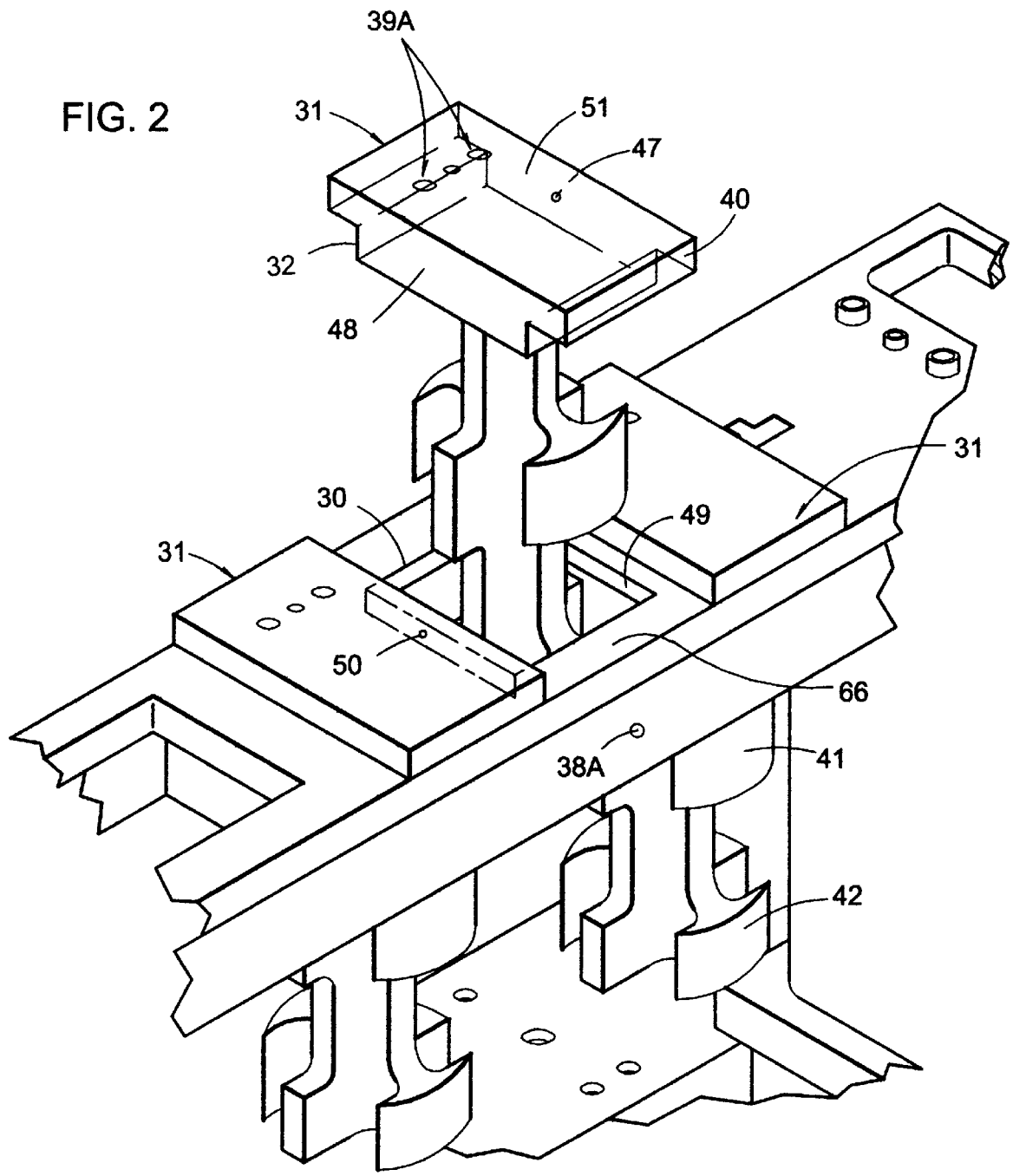
FIG. 2 is an enlarged view of a portion of FIG. 1 with an aligning cylinder lifted vertically away from the mounting plate.
Figure 3:
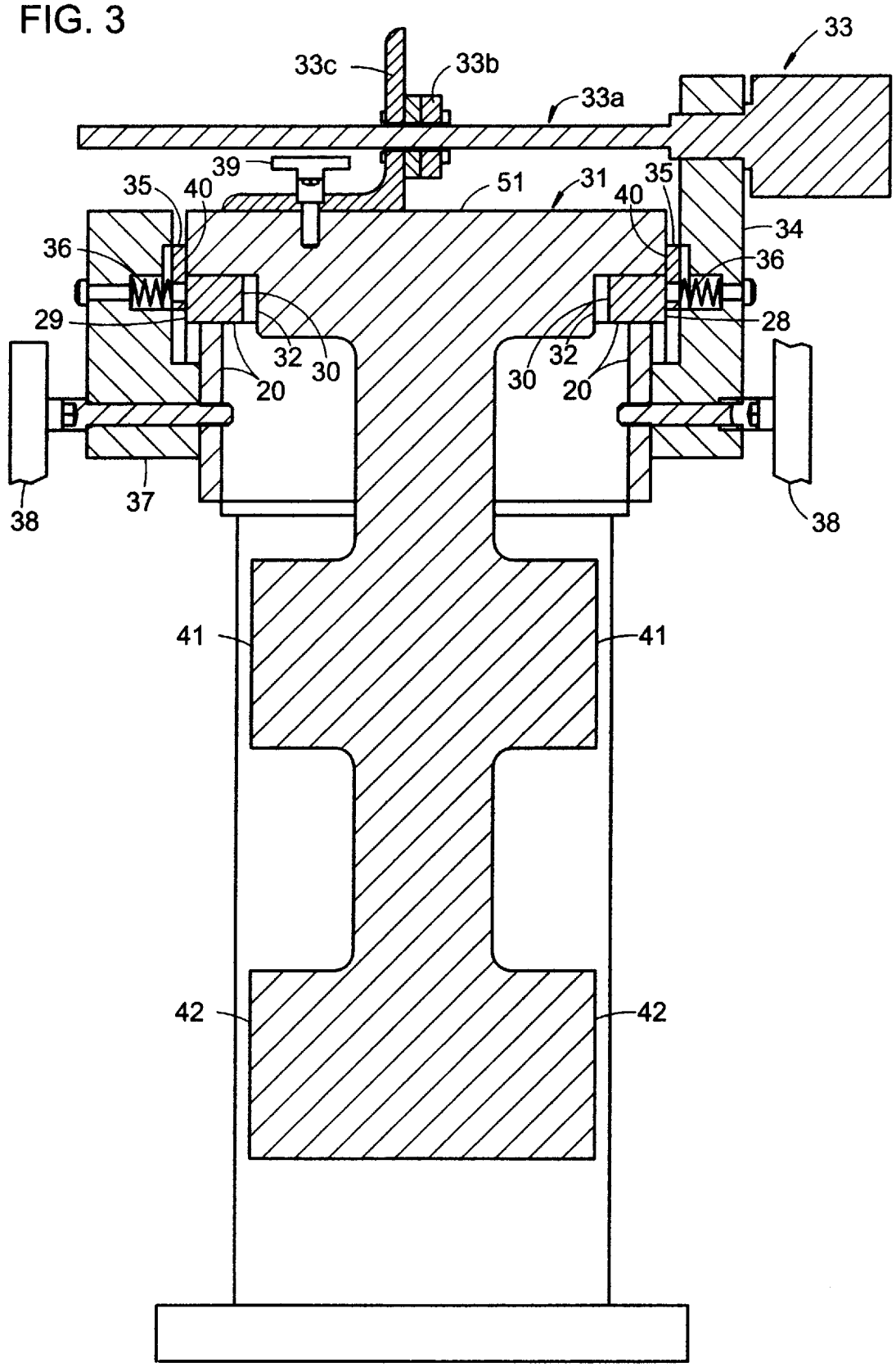
FIG. 3 is a cross sectional view taken at 3—3 of FIG. 1.

The right portion of the mounting plate overlies the blow station of the section and the left portion of the mounting plate overlies the blank station of the section. At each station a number of vertical openings 30 (FIG. 2) are defined in the mounting plate which correspond to the number of bottles being made in the section. In the illustration the section is triple gob in configuration which means that three bottles will be made in each section each cycle and accordingly there are three openings at each station. Assembled into these openings 30 are aligning cylinders 31. Each aligning cylinder 31 has reduced parallel sides 47, 48 which cooperate with the parallel sides 49, 50 of the opening 30 to key the aligning cylinder 31 to the mounting plate 20 so that it can slide a limited amount only in the direction parallel to the mold opening and closing motion. The aligning cylinder 31 also has a top portion with parallel sides 40 and a second reduced portion with parallel sides 32 (FIG. 3). The number of aligning cylinders at each station is equal to the number of bottle molds at each station so as to equalize the forces on the mold clamping surfaces to keep the aligning cylinders and the mold holders of the mold opening and closing mechanism in centerline alignment when in the closed clamped position.

A position transducer 33 is mounted parallel to the mold opening and closing motion of the center aligning cylinder at the blank station. The transducer assembly consists of the transducer 33, a first mounting block 34 with a spring plate 35 and a spring 36, a second mounting block 37 with a spring plate 35 and a spring 36, and a hand screw 38 which is carried by the first mounting block and is threadedly received by a suitably threaded opening 38A defined in the edge of the mounting plate at each aligning cylinder and a pair of hand screws 39 which are carried by the second mounting block and are threadedly received by suitably threaded openings 39A defined in the top surface of the top portion of each aligning cylinder. The parallel sides 40 of the top portion 51 of the aligning cylinder 31 are designed to match the parallel sides 28, 29 of the mounting plate 20 so that the spring plates 35 and the springs 36 hold the aligning cylinder 31 on the frame theoretical centerline. In this position, the signal from the transducer 33, which is connected to the mold opening and closing servo motion control interface board, is used by the displacement program 54 as the zero reference position for that mold open and close mechanism. The aligning cylinder 31 has clamping surfaces 41, 42. Mating clamping surfaces 43, 44 on the mold opening and closing mechanism will contact these surfaces 41, 42 when cycled to the clamped closed position.

In practice, the mold opening and closing mechanism carries bottle molds that are split in half with each half supported on a mold holder 45 (FIG. 4) that is supported for movement between a retracted spaced position and an advanced clamped closed position by a driving means such as a servo driven ball screw 52. A Controller 56 includes a Feed Program 54 which will instruct one servo driven ball screw to displace the associated mold holder a distance X and instruct the other servo driven ball screw to displace the associated mold holder by a distance Y. X and Y could be the same distance and could, for example be defined as the distance between the mold holders at the retracted position located against physical stops, divided by two. When the mold opening and closing mechanism is in the clamped closed position, the vertical plane where the halves forcefully engage is the actual center plane in which lies the actual centerline of molds supported by the mold holders and clamped together or an aligning cylinder. As shown, X and Y can be set by the operator during set up to locate the actual centerline roughly at the theoretical centerline and they may be the same. Alignment is to precisely locate this actual centerline so that it coincides with the theoretical centerline.

Surfaces 41 and 42 represent the outer surfaces of these mold halves so that when the mold holders close on the aligning fixture, this will duplicate the location of the bottle molds when bottles are being made. When the mold opening and closing mechanism RH (right hand) side and the LH (left hand) side are moved to the clamped closed position, the actual centerline may not coincide with the theoretical centerline. If this is done when the aligning fixture is in position, the transducer sliding part 33b will move relative to the fixed part 33a as the aligning cylinder is displaced from its initial location with its center on the theoretical centerline to its final location clamped within the mold holders with its center now at the actual centerline and a Position Signal 57 will be generated representing this distance which will be supplied to the X,Y Offset Computer 58. The X,Y Offset Computer 58 will define X, Y Offsets 59 (one half of the displacement sensed by the transducer, for example) which will be supplied to the Feed Program 54. The Feed Program 54 will process these offsets, changing the X and Y displacement values so that the right hand and left hand sides will now close on the theoretical centerline which is the section frame centerline. This correction will occur within one cycle of the mold opening and closing mechanism.

After alignment of the blank mold set, the transducer assembly is easily moved to the blow mold set so that they can be aligned in the same manner. Thus it can be seen that the blank mold opening and closing mechanism and the blow mold opening and closing mechanism are easily aligned to the frame centerline and therefore they are aligned to each other and to all other mechanisms which are aligned to the frame centerline. After alignment is completed, with the fixture assembled to the section, a mold opening and closing mechanism can be run in the normal operating mode to dynamically check the alignment.

Since the parallel sides 40 of the top portion of the aligning cylinders 31 are interchangeable and designed to match the parallel sides 28, 29 of the mounting plate 20, whenever the alignment fixture is in use an out of alignment can be visually observed as a result of an overlapping of these surfaces.

What is claimed is:

1. A mold opening and closing mechanism for a section of an I.S. glass forming machine, the section having a frame with a top surface, comprising first and second mold holders each having a number of clamping surfaces corresponding to the number of molds for bottles to be made in the section, first means for displacing said first mold holder from a retracted open position to an advanced clamped closed position, second means for displacing said second mold holder from a retracted open position to an advanced clamped closed position, and an alignment mechanism including a mounting plate, means for horizontally supporting said mounting plate over said first and second mold holders when said mold holders are located at said advanced clamped closed position, said mounting plate including a number of vertical openings corresponding to the number of molds in the section, a corresponding number of aligning cylinders located in said horizontal mounting plate vertical openings and keyed with said horizontal mounting plate to move parallel with the mold holder motion, said aligning cylinders each including surfaces configured to mate with the corresponding clamping surfaces of the mold holders when said mold holders are displaced to said advanced clamped closed position, means to locate the axis of one of the said aligning cylinders at the theoretical centerline so that said aligning cylinder can move from the theoretical center line to the actual center line when the mold holders are located at the advanced clamped closed position, a position transducer mounted parallel with mold holder motion to sense movement of the axis of said one of the aligning cylinders and computer means for operating a feed program to displace said first mold holder a selected first distance from the retracted position to the advanced closed clamped position and to displace said second mold holder a selected second distance from the retracted position to the advanced closed clamped position, for receiving positional data from said position transducer, and for defining displacement offsets for said selected first and second distances whereby said first and second mold holders will be aligned to the theoretical centerline when advanced to the advanced closed clamped position.

2. A mold opening and closing mechanism for a section of an I.S. glass forming machine according to claim 1, wherein each of said aligning cylinders includes a top portion and the dimension of each of said top portions and the dimension of said mounting plate in the direction of mold holder motion are the same.

3. A mold opening and closing mechanism for a section of an I.S. glass forming machine according to claim 2, wherein each top portion includes threaded hole means and wherein said position transducer includes a first mounting block including threaded fastener means for insertion into said threaded hole means and wherein said mounting plate includes threaded hole means and said position transducer includes a second mounting block including threaded fastener means for insertion into said mounting plate threaded hole means.

* * * * *